United States Patent [19]

Hasegawa et al.

[11] 4,418,674
[45] Dec. 6, 1983

[54] ELECTRONIC FUEL INJECTION CONTROL SYSTEM FOR MULTI-CYLINDER INTERNAL COMBUSTION ENGINES

[75] Inventors: Shumpei Hasegawa, Niiza; Akihiro Yamato, Sayama, both of Japan

[73] Assignee: Honda Giken Kogyo Kabushiki Kaisha, Tokyo, Japan

[21] Appl. No.: 384,608

[22] Filed: Jun. 3, 1982

[30] Foreign Application Priority Data

Jun. 10, 1981 [JP] Japan ................................. 56-89025

[51] Int. Cl.³ .............................................. F02D 5/02
[52] U.S. Cl. .................................. 123/491; 123/274; 123/179 L
[58] Field of Search ................... 123/491, 179 L, 274, 123/472

[56] References Cited

U.S. PATENT DOCUMENTS 3,847,130 11/1974 Miyoshi et al. ...................... 123/491
3,923,031 12/1975 Keranen .......................... 123/179 L
4,069,795 1/1978 Long et al. .......................... 123/491

FOREIGN PATENT DOCUMENTS 55-151128 11/1980 Japan .................................... 123/491

Primary Examiner—William A. Cuchlinski, Jr.
Assistant Examiner—Andrew M. Dolinar
Attorney, Agent, or Firm—Lyon & Lyon

[57] ABSTRACT

A plurality of fuel injection valves are all opened at the same time to supply fuel to all the cylinders of the engine, immediately upon closing of the starting switch. None of the fuel injection valves is opened until after the pistons of all the cylinders each have finished its one suction stroke after the above closing of the starting switch. Then, all the fuel injection valves are successively opened in predetermined sequence in synchronism with pulses of a TDC signal generated after the completion of the above suction strokes of the pistons of all the cylinders, to supply fuel to their respective cylinders, thereby obtaining smooth and positive starting of the engine.

3 Claims, 12 Drawing Figures

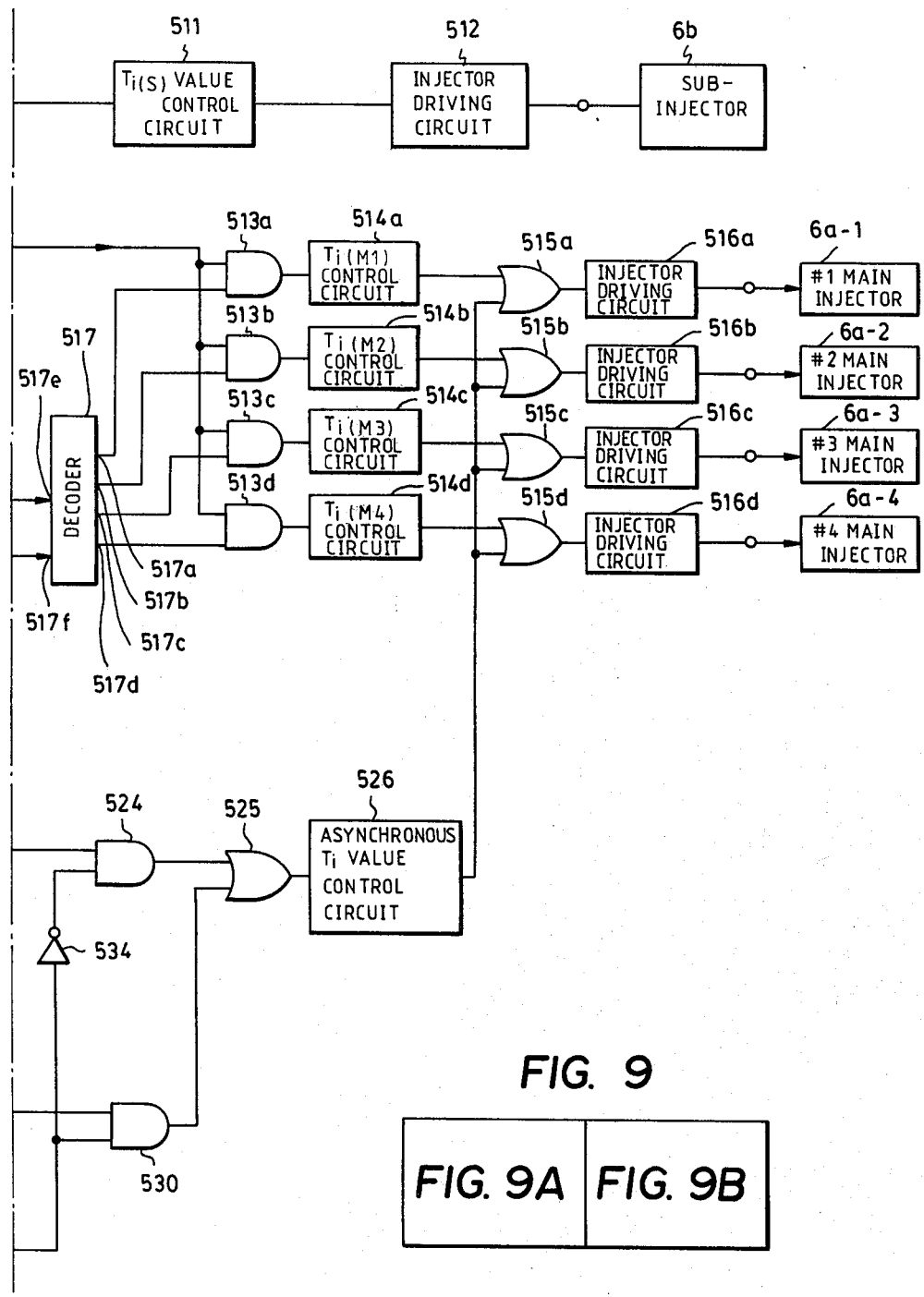

ELECTRONIC FUEL INJECTION CONTROL SYSTEM FOR MULTI-CYLINDER INTERNAL COMBUSTION ENGINES

BACKGROUND OF THE INVENTION

This invention relates to an electronic fuel injection control system for multi-cylinder internal combustion engines, and more particularly to a fuel injection control system of this kind which is capable of obtaining smooth and positive starting of the engine.

An electronic fuel injection control system adapted for use with an internal combustion engine, particularly a gasoline engine has been proposed e.g. by U.S. Ser. No. 348,648 filed Feb. 12, 1982 by the assignee of the present application, which is adapted to determine the valve opening period of a fuel injection means for control of the fuel injection quantity, i.e. the air/fuel ratio of an air/fuel mixture being supplied to the engine, by first determining a basic value of the above valve opening period as a function of engine rpm and intake pipe absolute pressure and then adding to and/or multiplying same by constants and/or coefficients being functions of engine rpm, intake pipe absolute pressure, engine temperature, throttle valve opening, exhaust gas ingredient concentration (oxygen concentration), etc., by electronic computing means.

The above-proposed electronic fuel injection control system, when applied to a multi-cylinder internal combustion engine, is arranged such that injectors, which are each provided for each cylinder of the engine, are actuated in predetermined sequence in synchronism with pulses of a TDC signal indicative of the pistons passing predetermined positions relative to the top-dead-center (TDC) positions within the cylinders. Determination as to which cylinders the individual pulses of the TDC signal correspond to is made on the basis of the timing of generation of a cylinder-discriminating signal which is generated each time the crankshaft rotates through a predetermined angle, to thereby carry out fuel injection into the cylinders in predetermined sequence.

However, at the start of the engine, in most cases the above cylinder-discriminating signal is not generated immediately upon starting of the engine, depending upon the angular position of the crankshaft assumed immediately before the start of the engine. In such cases, there can occur a noncoincidence in timing between the suction stroke of a certain cylinder and the valve opening action of the corresponding injector, so that the supply of fuel into the cylinders is not effected smoothly, preventing smooth and positive starting of the engine.

OBJECT AND SUMMARY OF THE INVENTION

It is the object of the invention to provide an electronic fuel injection control system for multi-cylinder internal combustion engines, which is adapted to perform the supply of fuel into a plurality of cylinders of the engine in an even manner at the start of the engine to assure smooth and positive starting of the engine.

The electronic fuel injection control system according to the present invention comprises a sensor for detecting at least one predetermined angular position of the output shaft of the engine to generate a signal indicative of a detected angular position, a plurality of fuel injection valves corresponding in number to the cylinders, each provided for each of the cylinders, a control circuit adapted to cause opening of the fuel injection valves in synchronism with generation of the above angular position signal, for supplying a controlled amount of fuel into the cylinders, and a starting switch adapted to actuate the starter of the engine when closed. The above control circuit is operable as follows: Immediately upon closing of the starting switch, all the fuel injection valves are opened at the same time to supply fuel into their respective cylinders. None of the valves are opened until after the pistons of all the cylinders have finished their first suction strokes after the above closing of the starting switch. Upon completion of the first suction strokes of all the cylinders, all the fuel valves are successively opened in predetermined sequence in synchronism with subsequent generation of the angular position signal occurring after the completion of the above first suction strokes of the pistons of all the cylinders to supply fuel to their respective cylinders.

The above and other objects, features and advantages of the invention will be more apparent from the ensuing detailed description taken in connection with the accompanying drawings in which:

BRIEF DESCRIPTION OF THE DRAWINGS

FIG. 9, 9a and 9b are a circuit diagram illustrating the whole internal arrangement of the ECU, showing in particular detail fuel supply means operable immediately upon the start of the engine.

DETAILED DESCRIPTION

Figure 1:
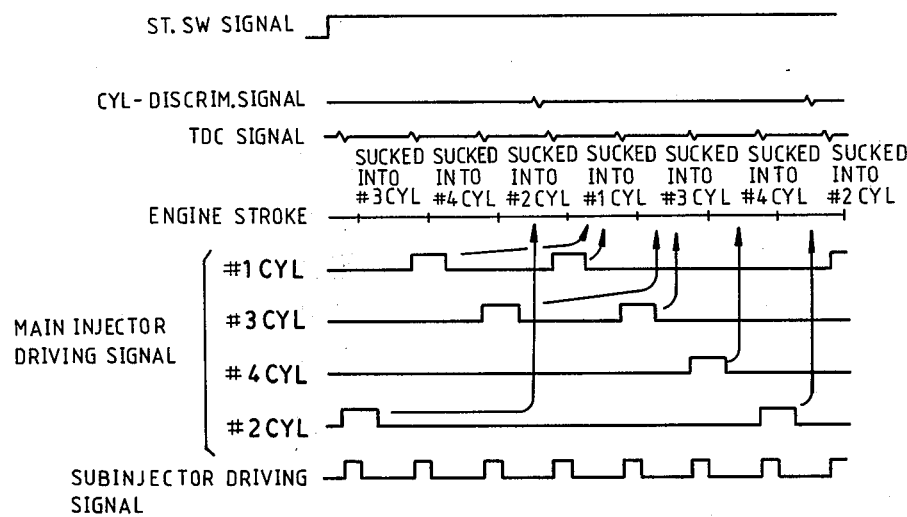
FIG. 1 is a timing chart showing an example of an improper manner of fuel injection into a multi-cylinder internal combustion engine, effected immediately after the start of the engine.

Referring first to FIG. 1, an example of a manner of fuel injection into a multi-cylinder internal combustion engine at the start of same will now be explained in which fuel injection is not carried out in a proper manner. When the starting switch for actuating the starter of the engine is actuated or closed, the cylinders of the engine successively undergo suction strokes of pistons by the action of the starter. That is, according to the example of FIG. 1, suction first takes place at the third cylinder, and then at the fourth cylinder, the second cylinder, the first cylinder and the third cylinder, in the mentioned sequence. Fuel injection into the cylinders should be carried out in prescribed sequence by means of injectors arranged at the respective cylinders in a manner corresponding in timing to the suction strokes of the pistons of the cylinders. However, a pulse of a cylinder-discriminating signal, which is generated by a particular cylinder-discriminating means, is not always generated and inputted to the ECU immediately upon starting of the engine. Thus, it is difficult to achieve fuel injection into the cylinders in prescribed sequence in a manner corresponding to the suction strokes of the pistons of the cylinders, until after a first pulse of the above cylinder-discriminating signal has been imputted to the ECU. In the example of FIG. 1, the fuel injection valve at the second cylinder is first actuated, followed by successive actuation of the first one and the third one, etc. The first pulse of the cylinder-discriminating signal is inputted to the ECU before a first pulse of the driving signal for the valve at the fourth cylinder is outputted therefrom. After this inputting of the first pulse of the cylinder-discriminating signal, the proper order of actuation of the fuel injection valves can be determined, so that after outputting of the next driving signal pulse for the valve at the first cylinder, fuel injection is carried out in the above-mentioned proper sequence in a manner corresponding in timing to the suction strokes of the pistons of the cylinders. According to the fuel injection into the cylinders in the above sequence, it is to be noted that no fuel injection occurs at all, which corresponds to the suction strokes of the pistons of the third and fourth cylinders taking place immediately after the start of the engine, that is, only air is sucked into these cylinders where no combustion takes place. Further, although during the suction stroke of the piston in the second cylinder, the second cylinder is supplied with fuel which was injected into the intake pipe portion leading to the second cylinder during the preceding suction stroke of the piston in the third cylinder to thus obtain normal combustion in the second cylinder, fuel previously injected into the respective intake pipe portions is also sucked together with fuel just injected, into the first cylinder and the third cylinder during the suction strokes of the latter cylinders following the above suction stroke of the second cylinder, that is, double injections take place at the first and fourth cylinders so that these cylinders are supplied with excessive amounts of fuel. After this, normal fuel injection takes place at the fourth cylinder, et seq. In this manner, due to the fact that the first pulse of the cylinder-discriminating signal is not always generated immediately upon starting of the engine, the supply of fuel into the cylinders is not effected in a proper manner immediately after the start of the engine, that is, no injection takes place or double injections take place at some cylinders, preventing smooth and positive starting of the engine. Incidentally, the fuel injection by means of the subinjector is effected in a proper manner immediately after the start of the engine, even when a first pulse of the cylinder-discriminating signal is not generated immediately upon starting of the engine, because the subinjector which is single in number supplies fuel to all the cylinders.

The present invention will now be described in detail with reference to the drawings.

Figure 3:
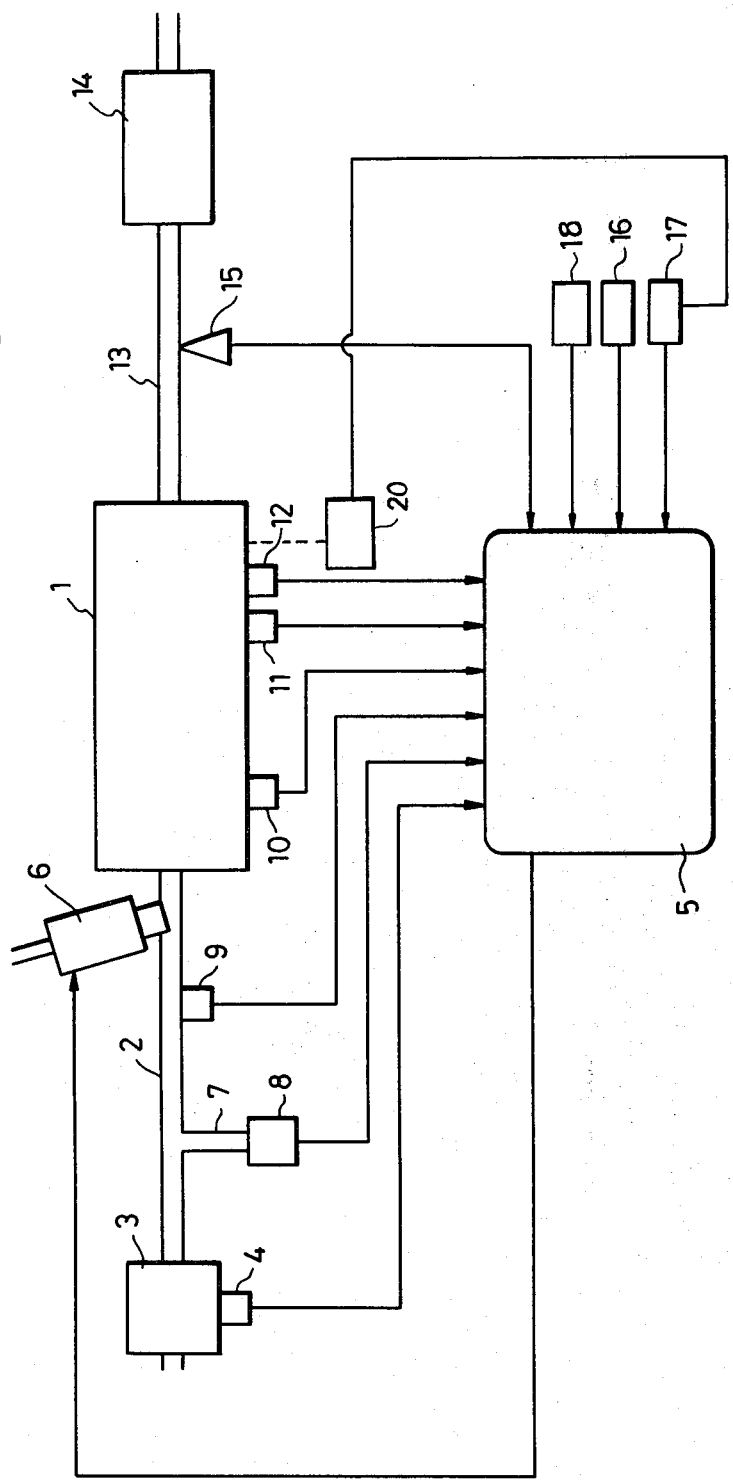
FIG. 3 is a block diagram illustrating the whole arrangement of an electronic fuel injection control system according to one embodiment of the present invention.
Figure 4:
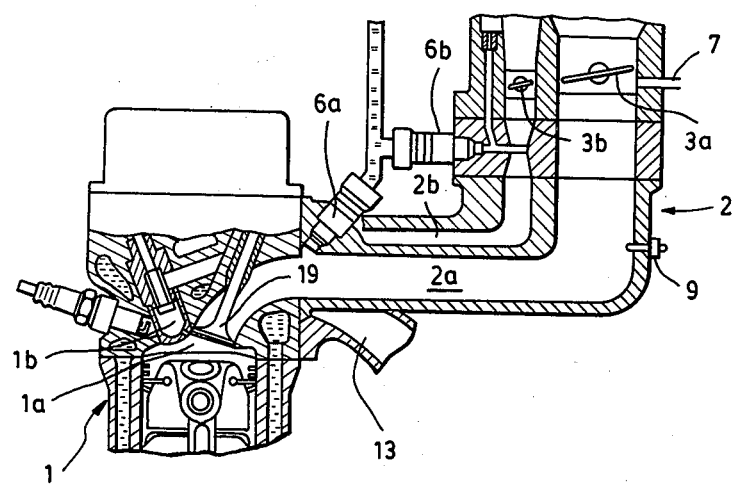
FIG. 4 is a view illustrating details of the engine in FIG. 3 and its peripheral parts.

FIG. 3 illustrates the whole arrangement of a fuel injection control system for internal combustion engines, to which the present invention is applicable, and FIG. 4 illustrates details of the engine in FIG. 3 and its peripheral parts. Reference numeral 1 designates an internal combustion engine which may be a four-cylinder type, for instance. This engine 1 has main combustion chambers 1a which may be four in number and sub combustion chambers 1b communicating with the respective main combustion chambers 1a. An intake pipe 2 is connected to the engine 1, which comprises a main intake pipe 2a communicating with each main combustion chamber 1a, and a sub intake pipe 2b with each sub combustion chamber 1b, respectively. Arranged across the intake pipe 2 is a throttle body 3 which accommodates a main throttle valve 3a and a sub throttle valve 3b mounted in the main intake pipe and the sub intake pipe, respectively, for synchronous operation. A throttle valve opening sensor 4 is connected to the main throttle valve 3a for detecting its valve opening and converting same into an electrical signal which is supplied to an electronic control unit (hereinafter called "ECU") 5.

A fuel injection device 6 is arranged in the intake pipe 2 at a location between the engine 1 and the throttle body 3, which comprises main injectors 6a and a subinjector 6b. The main injectors correspond in number to the engine cylinders and are each arranged in the main intake pipe 2a at a location slightly upstream of an intake valve 19 of a corresponding engine cylinder, while the subinjector 6b, which is single in number, is arranged in the sub intake pipe 2b at a location slightly downstream of the sub throttle valve 3b, for supplying fuel to all the engine cylinders. The main injectors 6a and the subinjector 6b are electrically connected to the ECU 5 in a manner having their valve opening periods or fuel injection quantities controlled by signals supplied from the ECU 5.

On the other hand, an absolute pressure sensor 8 communicates through a conduit 7 with the interior of the main intake pipe 2a of the throttle body 3 at a location immediately downstream of the main throttle valve 3a. The absolute pressure sensor 8 is adapted to detect absolute pressure in the intake pipe 2 and applies an electrical signal indicative of detected absolute pressure to the ECU 5. An intake-air temperature sensor 9 is arranged in the intake pipe 2 at a location downstream of the absolute pressure sensor 8 and also electrically connected to the ECU 5 for supplying thereto an electrical signal indicative of detected intake-air temperature.

An engine water temperature sensor 10, which may be formed of a thermistor or the like, is mounted on the main body of the engine 1 in a manner embedded in the peripheral wall of an engine cylinder having its interior filled with cooling water, an electrical output signal of which is supplied to the ECU 5.

An engine rpm sensor (hereinafter called "Ne sensor") 11 and a cylinder-discriminating sensor 12 are arranged in facing relation to a camshaft, not shown, of the engine 1 or a crankshaft of same, not shown. The former 11 is adapted to generate one pulse at particular crank angles each time the engine crankshaft rotates through 180 degrees, i.e., each pulse of the top-dead-center position (TDC) signal, while the latter is adapted to generate one pulse at a particular crank angle of a particular engine cylinder. The above pulses generated by the sensors 11, 12 are supplied to the ECU 5.

A three-way catalyst 14 is arranged in an exhaust pipe 13 extending from the main body of the engine 1 for purifying ingredients HC, CO and NOx contained in the exhaust gases. An $O_2$ sensor 15 is inserted in the exhaust pipe 13 at a location upstream of the three-way catalyst 14 for detecting the concentration of oxygen in the exhaust gases and supplying an electrical signal indicative of a detected concentration value to the ECU 5.

Further connected to the ECU 5 are a sensor 16 for detecting atmospheric pressure, a starting switch 17 which is connected to the starter 20 of the engine 1 for actuating same when closed, and a battery 18, respectively, for supplying an electrical signal indicative of detected atmospheric pressure, an electrical signal indicative of its own on and off positions, and a supply voltage to the ECU 5. The starting switch 17 is arranged to electrically connect the starter motor 20 to the battery 18 when closed.

Next, the fuel quantity control operation of the electronic fuel injection control system of the invention arranged as above will now be described in detail with reference to FIGS. 3 and 4 referred to hereinabove as well as FIG. 2 and FIGS. 5 through 9.

Figure 5:
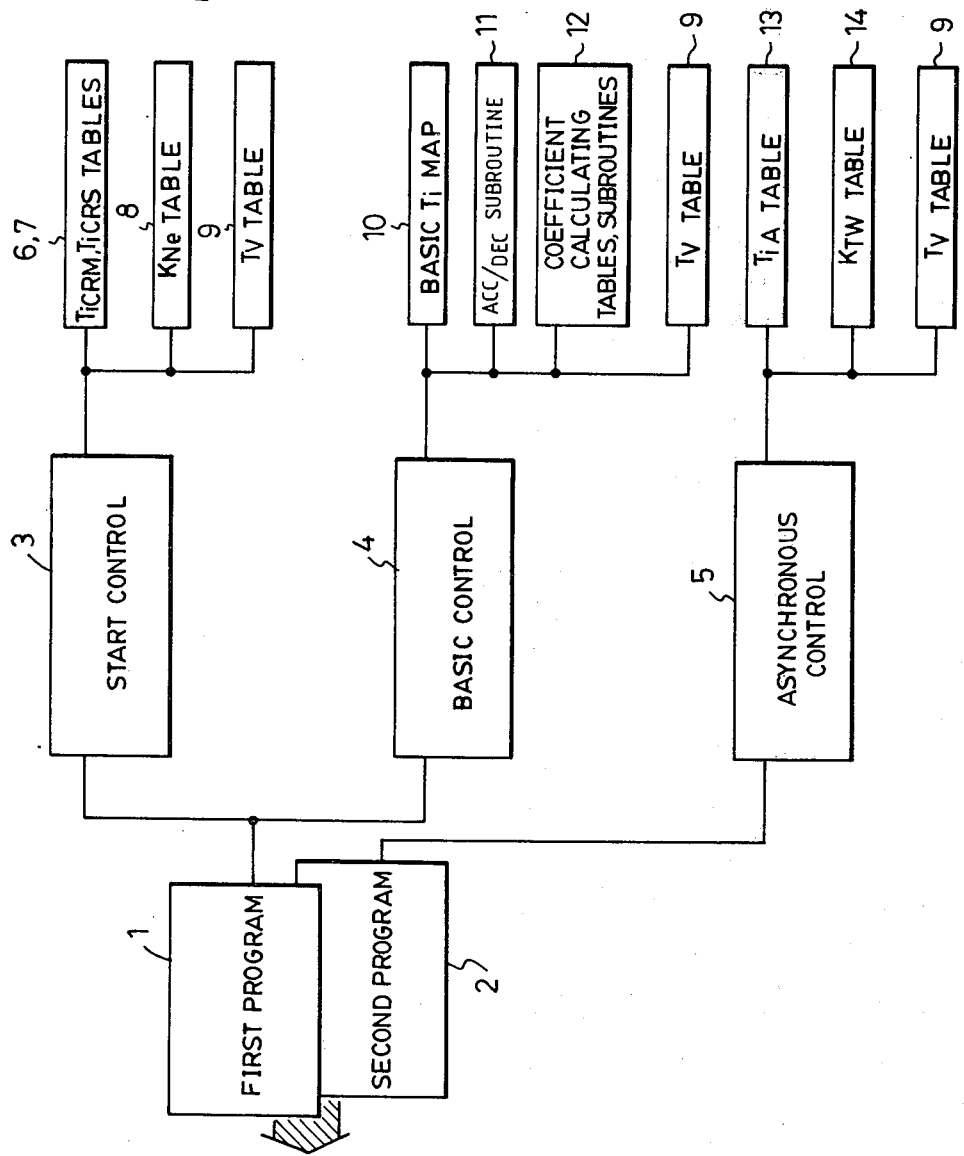
FIG. 5 is a block diagram illustrating a program for control of the valve opening periods TOUTM and TOUTS of the main injectors and the subinjector, which is operated by an electronic control unit (ECU) in FIG. 3.

Referring first to FIG. 5, there is illustrated a block diagram showing the whole program for fuel injection control, i.e. control of valve opening periods TOUTM and TOUTS of the main injectors 6a and the subinjector 6b, which is executed by the ECU 5. The program comprises a first program 1 and a second program 2. The first program 1 is used for fuel quantity control in synchronism with the TDC signal, hereinafter merely called "synchronous control" unless otherwise specified, and comprises a start control subroutine 3 and a basic control subroutine 4, while the second program 2 comprises an asynchronous control subroutine 5 which is carried out in asynchronism with or independently of the TDC signal.

In the start control subroutine 3, the valve opening periods TOUTM and TOUTS are determined by the following basic equations:

$$TOUTM = TiCRM \times KNe + (TV + \Delta TV) \quad (1)$$

$$TOUTS = TiCRS \times KNe + TV \quad (2)$$

where TiCRM and TiCRS represent basic values of the valve opening periods for the main injectors and the subinjector, respectively, which are determined from a TiCRM table 6 and a TiCRS table 7, respectively, KNe represents a correction coefficient applicable at the start of the engine, which is variable as a function of engine rpm Ne and determined from a KNe table 8, and TV represents a constant for increasing and decreasing the valve opening period in response to changes in the output voltage of the battery, which is determined from a TV table 9. $\Delta TV$ is added to TV applicable to the main injectors as distinct from TV applicable to the subinjector, because the main injectors are structurally different from the subinjector and therefore have different operating characteristics.

The basic equations for determining the values of TOUTM and TOUTS applicable to the basic control subroutine 4 are as follows:

$$TOUTM = (TiM - TDEC) \times (KTA \times KTW \times KAFC \times KPA \times KAST \times KWOT \times KO_2 \times KLS) + TACC \times (KTA \times KTWT \times KAFC \times KAST \times KPA) + (TV + \Delta TV) \quad (3)$$

$$TOUTS = (TiS - TDEC) \times (KTA \times KTW \times KAST \times KPA) + TV \quad (4)$$

where TiM and TiS represent basic values of the valve opening periods for the main injectors and the subinjector, respectively, and are determined from a basic Ti map 10, and TDEC and TACC represent constant applicable, respectively, at engine deceleration and at engine acceleration and are determined by acceleration and decceleration subroutines 11. The coefficients KTA, KTW, etc. are determined by their respective tables and/or subroutines 12. KTA is an intake air temperature-dependent correction coefficient and is determined from a table as a function of actual intake air temperature, KTW a fuel increasing coefficient which is determined from a table as a function of actual engine cooling water temperature TW, KAFC a fuel increasing coefficient applicable after fuel cut operation and determined by a subroutine, KPA an atmospheric pressure-dependent correction coefficient determined from a table as a function of actual atmospheric pressure, and KAST a fuel increasing coefficient applicable after the start of the engine and determined by a subroutine. KWOT is a coefficient for enriching the air/fuel mixture, which is applicable at wide-open-throttle and has a constant value, $KO_2$ with "$O_2$ feedback control" correction coefficient determined by a subroutine as a function of actual oxygen concentration in the exhaust gases, and KLS a mixture-leaning coefficient applicable at "lean stoich." operation and having a constant value. The term "stoich." is an abbreviation of a word "stoichiometric" and means a stoichiometric or theoretical air/fuel ratio of the mixture. TACC is a fuel increasing constant applicable at engine acceleration and determined by a subroutine and from a table.

On the other hand, the valve opening period TMA for the main injectors which is applicable in asynchronism with the TDC signal is determined by the following equation:

$$TMA = TiA \times KTWT \times KAST + (TV + \Delta TV) \quad (5)$$

where TiA represents a TDC signal-asynchronous fuel increasing basic value applicable at engine acceleration and in asynchronism with the TDC signal. This TiA value is determined from a TiA table 13. KTWT is defined as a fuel increasing coefficient applicable at and after TDC signal-synchronous acceleration control as well as at TDC signal-asynchronous acceleration control, and is calculated from a value of the aforementioned water temperature-dependent fuel increasing coefficient KTW obtained from the table 14.

Figure 6:
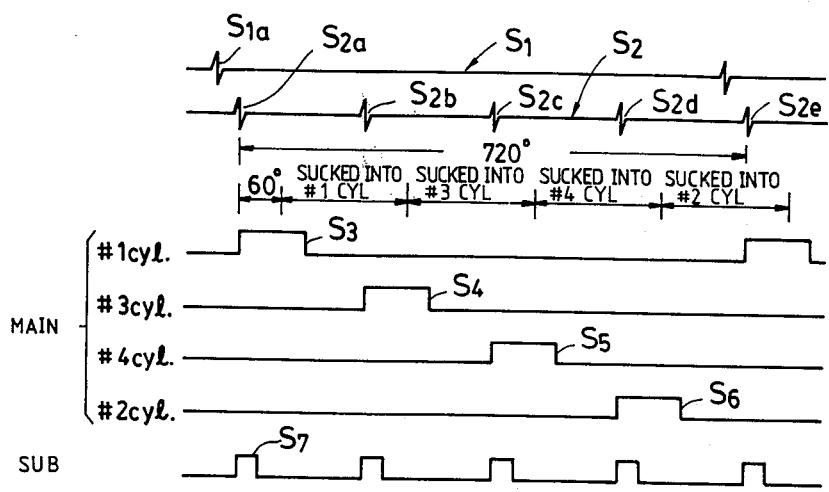
FIG. 6 is a timing chart showing the relationship between a cylinder-discriminating signal and a TDC signal inputted to the ECU, and driving signals for the main injectors and the subinjector, outputted from the ECU.

FIG. 6 is a timing chart showing the relationship between the cylinder-discriminating signal and the TDC signal, both inputted to the ECU 5, and the driving signals outputted from the ECU 5 for driving the main injectors 6a and the subinjector 6b, which relationship takes place during normal operation of the engine, not at the start of the engine. The cylinder-discriminating signal $S_1$ is inputted to the ECU 5 in the form of a pulse $S_{1a}$ each time the engine crankshaft rotates through 720 degrees. Pulses $S_{2a}$–$S_{2e}$ forming the TDC signal $S_2$ are each inputted to the ECU 5 each time the engine crankshaft rotates through 180 degrees. The relationship in timing between the two signals $S_1$, $S_2$ determines the output timing of driving signals $S_3$–$S_6$ for driving the main injectors 6a of the four engine cylinders. More specifically, the driving signal $S_3$ is outputted for driving the main injector of the first engine cylinder, concurrently with the first TDC signal pulse $S_{2a}$, the driving signal $S_4$ for the third engine cylinder concurrently with the second TDC signal pulse S₂b, the driving signal S₅ for the fourth cylinder concurrently with the third pulse S₂c, and the driving signal S₆ for the second cylinder concurrently with the fourth pulse S₂d, respectively. The subinjector driving signal S₇ is generated in the form of a pulse upon application of each pulse of the TDC signal to the ECU 5, that is, each time the crankshaft rotates through 180 degrees. It is so arranged that the pulses S₂a, S₂b, etc. of the TDC signal are each generated earlier by 60 degrees than the time when the piston in an associated engine cylinder reaches its top dead center, so as to compensate for arithmetic operation lag in the ECU 5, and a time lag between the formation of a mixture and the suction of the mixture into the engine cylinder, which depends upon the opening action of the intake valve before the piston reaches its top dead center and the operation of the associated injector.

Figure 2:
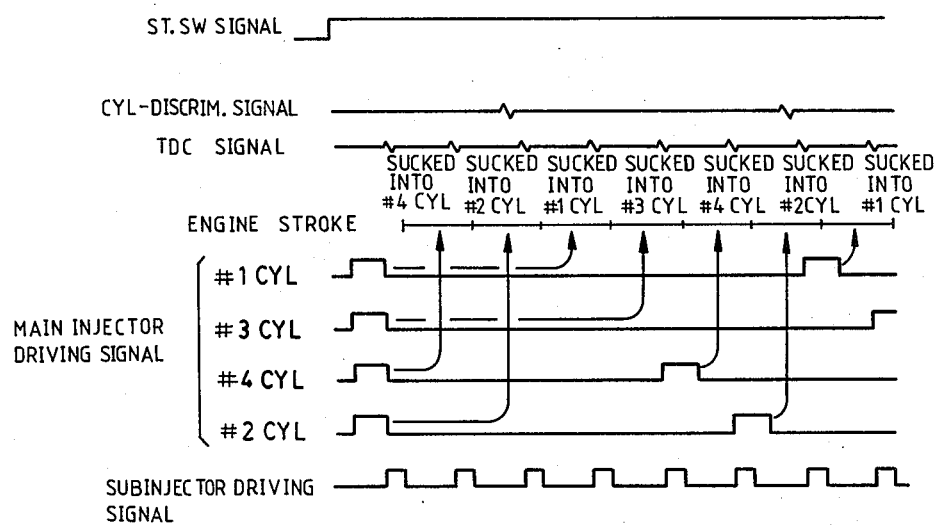
FIG. 2 is a view similar to FIG. 1, showing the manner of fuel injection according to the present invention.

The manner of supplying fuel into the engine cylinders immediately after the start of the engine according to the invention will now be described with reference to FIG. 2. According to the invention, a required amount of fuel is injected into all the cylinders at the same time, immediately upon closing of the starting switch 17, and no fuel injection is effected for any of the cylinders until after the pistons of all the cylinders have finished their first suction strokes after the closing of the starting switch 17. A first pulse of the cylinder-discriminating signal is inputted to the ECU 5 without fail before the pistons of all the cylinders finish their first suction strokes. Therefore, after the first suction strokes of all the cylinders have been completed, the ECU 5 can determine which cylinder should have its main injector carry out fuel injection. In the example of FIG. 2, the piston of the fourth cylinder first executes its first suction stroke, followed by the first suction strokes of the pistons of the other cylinders, which are not accomplished by fuel injection, and then the main injector for the fourth cylinder carries out fuel injection, followed by fuel injections corresponding in timing to the subsequent suction strokes of the pistons of the other cylinders in predetermined sequence. At the first suction stroke of the piston of the fourth cylinder taking place immediately after the start of the engine, fuel injected into the intake pipe portion of the fourth cylinder just before the first suction stroke is supplied into the fourth cylinder. At the first suction stroke of the second cylinder, fuel injected into the intake pipe portion of the second cylinder just before the first suction stroke of the fourth cylinder is supplied into the second cylinder. Also at the first suction strokes of the first and third cylinders, fuel injected into the respective intake pipe portions just before the first suction stroke of the fourth cylinder is supplied into these cylinders. At the subsequent suction strokes of the four cylinders, fuel injected into the respective intake pipe portions just before their respective suction strokes is supplied into the cylinders in the predetermined sequence.

Figure 7A:
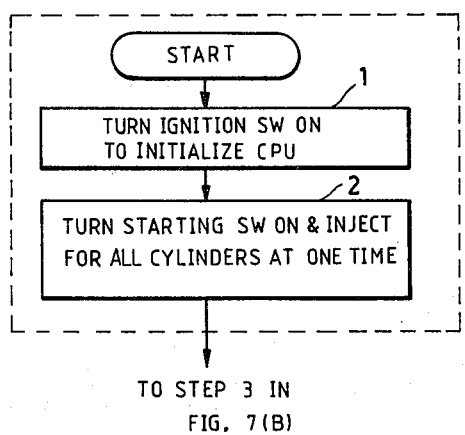
FIGS. 7a and 7b are a flow chart showing a main program for calculation of the valve opening periods TOUTM and TOUTS.
Figure 7B:
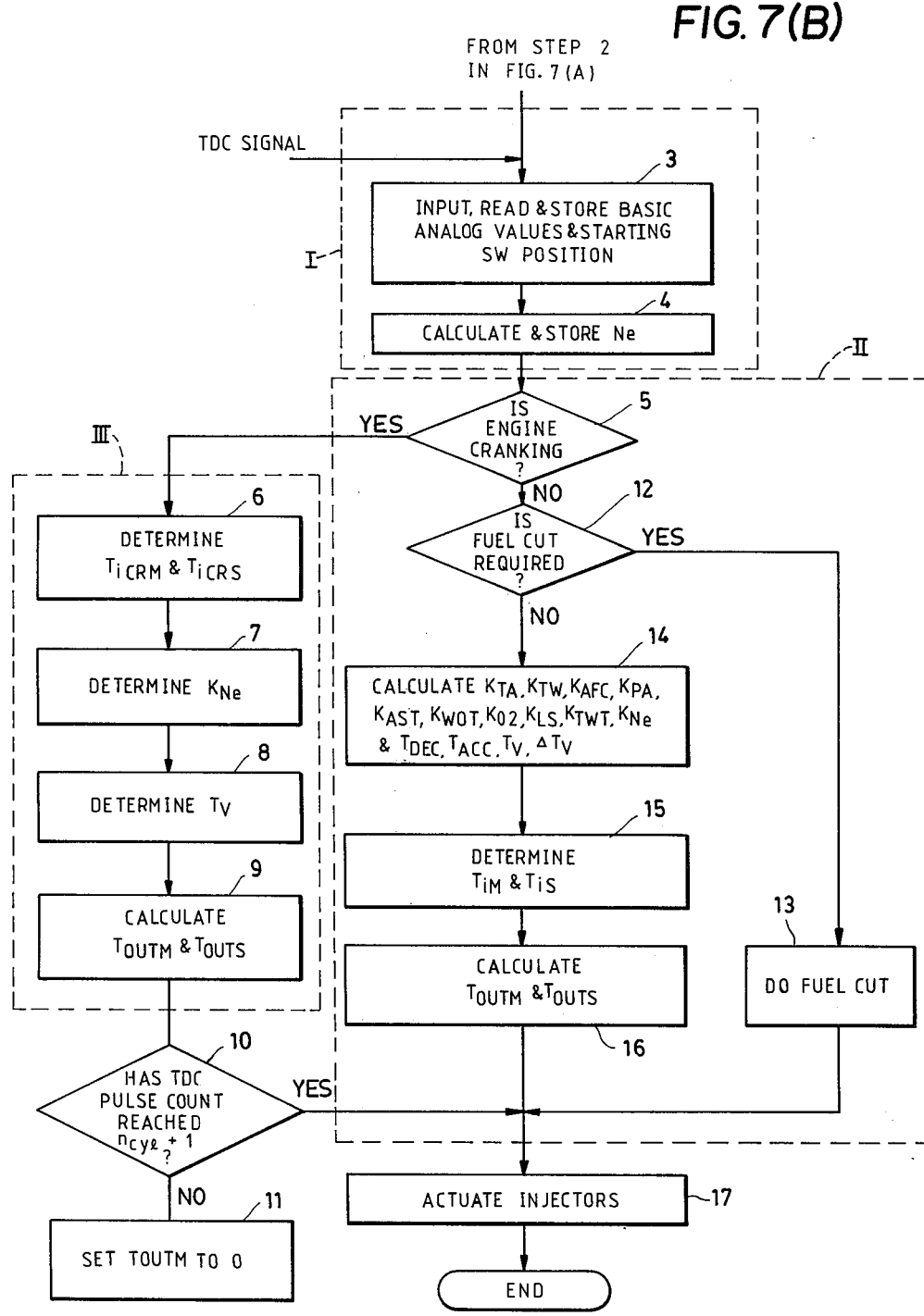

Referring next to FIG. 7, the part (A) is a flow chart of start control applicable from closing of the ignition switch to closing of the starting switch, and the part (B) a flow chart of the aforementioned first program 1 for control of the valve opening period in synchronism with the TDC signal in the ECU 5, respectively. The whole program comprises an input signal processing block I, a basic control block II and a start control block III. First in the start control of the part (A), when the ignition switch of the engine is turned on, a CPU in the ECU 5 is initialized at the step 1. The starting switch 17 is turned on or closed and simultaneously with or immediately upon the closing of the starting switch 17, the main injectors are actuated to effect fuel injection for all the cylinders at the same time, at the step 2. Incidentally, as to the fuel injection by means of the subinjector, its valve opening period Ti is calculated in accordance with a subroutine for calculation of the valve opening period of the subinjector and an amount of fuel corresponding to the calculated valve opening period is supplied to all the cylinders in synchronism with generation of the TDC signal immediately upon and after the start of the engine.

As pulses of the TDC signal are inputted to the ECU 5, all basic analog values are inputted to the ECU 5, which include detected values of atmospheric pressure PA, absolute pressure PB, engine cooling water temperature TW, atmospheric air temperature TA, throttle valve opening $\theta$th, battery voltage V, output voltage value V of the O₂ sensor and on-off state of the starting switch 17, some necessary ones of which are then stored therein (step 3). Further, the period between a pulse of the TDC signal and the next pulse of same is counted to calculate actual engine rpm Ne on the basis of the counted value, and the calculated value is stored in the ECU 5 (step 4). The program then proceeds to the basic control block II. In this block, a determination is made, using the calculated Ne value, as to whether or not the engine rpm is smaller than the cranking rpm (starting rpm) at the step 5. If the answer is affirmative, the program proceeds to the start control subroutine III. In this block, values of TiCRM and TiCRS are selected from a TiCRM table and a TiCRS table, respectively, on the basis of the detected value of engine cooling water temperature TW (step 6). Also, the value of Ne-dependent correction coefficient KNe is determined by using the KNe table (step 7). Further, the value of battery voltage-dependent correction constant TV is determined by using the TV table (step 8). These determined values are applied to the aforementioned equations (1), (2) to calculate the values of TOUTM and TOUTS (step 9). Then, it is determined at the step 10 whether or not the TDC pulse count has reached a value corresponding to the number ncyl of the cylinders plus one, that is, whether or not the pistons of all the cylinders have finished their first suction strokes after the closing of the starting switch 17. If the answer is negative, the valve opening period TOUTM for the main injectors is set to zero, at the step 11. If the answer is affirmative, that is, when the above first suction strokes of all the cylinders have been completed, the calculated value TOUTM is directly applied.

If the answer to the question of the above step 5 is negative, it is determined whether or not the engine is in a condition for carrying out fuel cut, at the step 10. If the answer is yes, the values of TOUTM and TOUTS are both set to zero, at the step 11.

On the other hand, if the answer to the question of the step 10 is negative, calculations are carried out of values of correction coefficients KTA, KTW, KAFC, KPA, KAST, KWOT, KO₂, KLS, KTWT, etc. and values of correction constants TDEC, TACC, TV, and ΔTV, by means of the respective calculation subroutines and tables, at the step 14.

Then, basic valve opening period values TiM and TiS are selected from respective maps of the TiM value and the TiS value, which correspond to data of actual engine rpm Ne and actual absolute pressure PB and/or like parameters, at the step 15.

Then, calculations are carried out of the values TOUTM and TOUTS on the basis of the values of correction coefficients and correction constants, etc. selected at the steps 14 and 15, as described above, using the aforementioned equations (3), (4) (the step 16). The main injectors and the subinjector are actuated with valve opening periods corresponding to the values of TOUTM and TOUTS obtained by the aforementioned steps 14 and 15 (the step 17).

As previously stated, in addition to the above-described control of the valve opening periods of the main injectors and the subinjector in synchronism with the TDC signal, asynchronous control of the valve opening period of the main injectors is carried out in a manner asynchronous with the TDC signal but synchronous with a certain pulse signal having a constant pulse repetition period, detailed description of which is omitted here.

Figure 8:
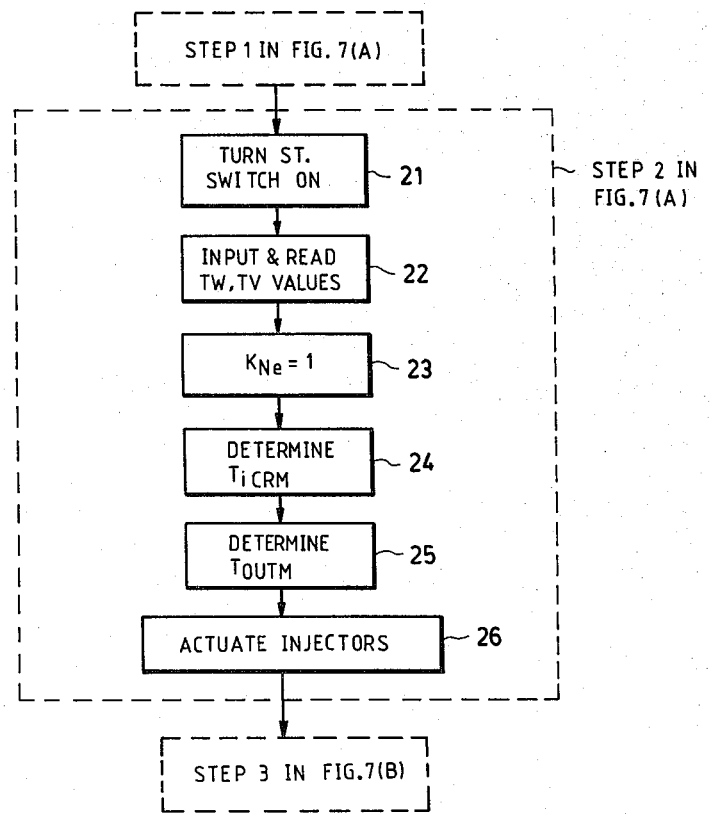
FIG. 8 is a flow chart showing details of the step 2 in FIG. 7.

FIG. 8 shows details of the step 2 in FIG. 7 (A). When the starting switch 17 is actuated or closed at the step 21, a calculation is made of the basic valve opening period TiCRM of the main injectors required for simultaneous fuel injection into all the cylinders. The manner of the calculation of the basic valve opening period TiCRM is identical with that of the start control subroutine 3 referred to previously. First, detected values of the engine temperature TW and the battery voltage TV are read into the ECU 5, at the step 22. At the present step 2, the engine rpm-dependent correction coefficient KNe is set to 1 (the step 23). A value of the basic valve opening period TiCRM is determined on the basis of the detected engine temperature TW, at the step 24. Then, the valve opening period TOUTM is calculated by using the aforementioned equation (1), at the step 25. The fuel injection valves or injectors arranged at all the cylinders are actuated at the same time for a period of time corresponding to the value TOUTM thus calculated, to supply a first batch of fuel to each of the cylinders, at the step 26. The aforementioned steps 21 through 26 are executed in an instant immediately upon the closing of the starting switch 17.

Although the basic valve opening period TiCRM for calculation of the final valve opening TOUTM for the first injection can be calculated in the same manner as that of the start control subroutine 3 as previously mentioned, alternatively the basic value TiCRM may be multiplied by a predetermined coefficient to calculate the final value TOUTM, if required.

Figure 9A:
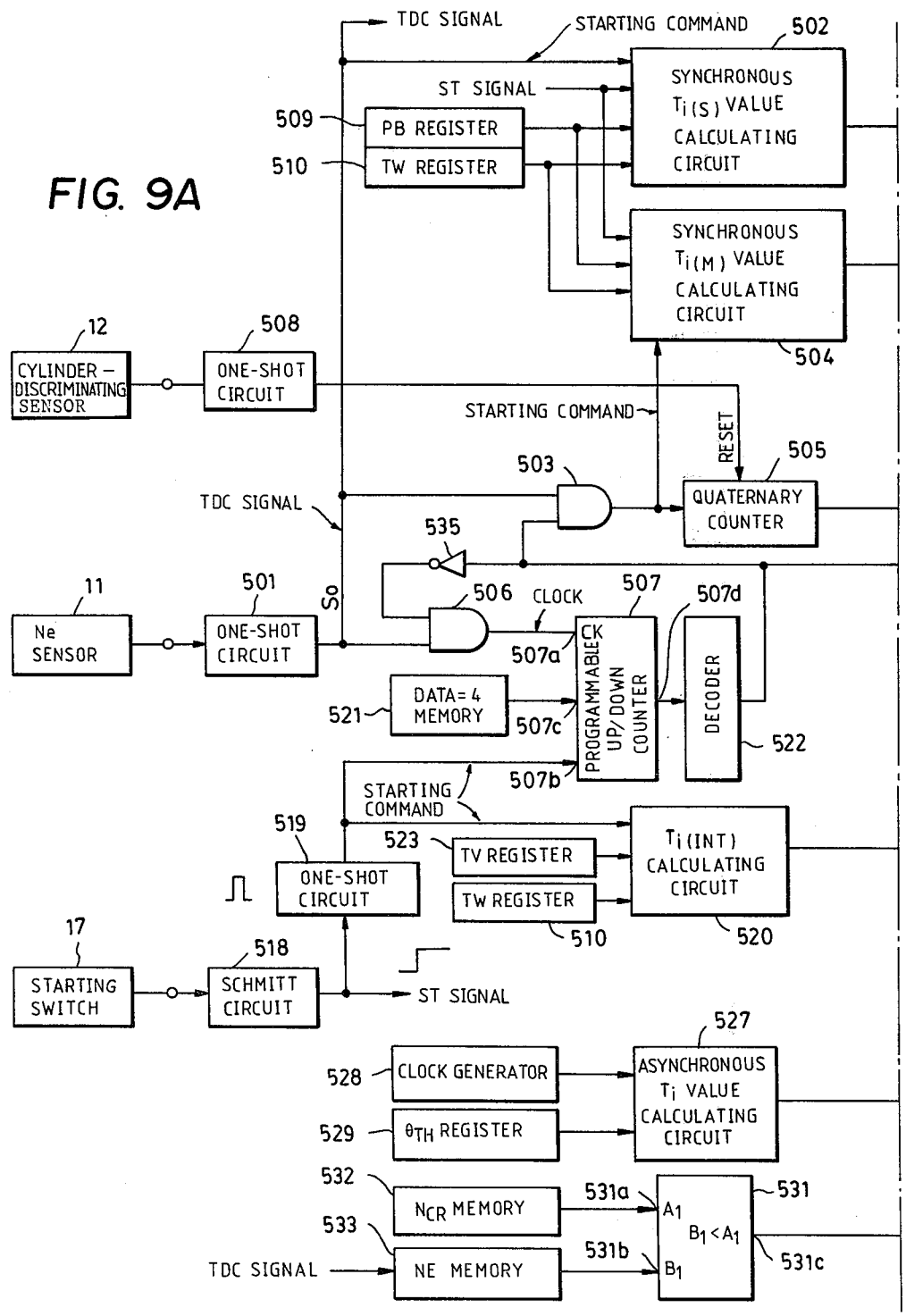

FIG. 9 illustrates the internal arrangement of the ECU 5 which is used in the electronic fuel injection control system of the invention, with a fuel supply control section operable at the start of the engine shown in particular detail. The engine rpm sensor 11 in FIG. 3 is connected to a one shot circuit 501 which is in turn connected to the input of a synchronous Ti(S) value calculating circuit 502 directly, and also to the input of a synchronous Ti(M) value calculating circuit 504 and the input of an up counter 505, by way of an AND circuit 503. The one shot circuit 501 is also connected to a first input terminal 507a of a programmable down counter 507 by way of an AND circuit 506. The cylinder-discriminating sensor 12 in FIG. 3 is connected to a reset pulse-input terminal of the aforementioned down counter 505 by way of a one shot circuit 508. The absolute pressure sensor 8 and the engine water temperature sensor 10 in FIG. 3 have their output values stored in a PB value register 509 and a TW value register 510, respectively, which are in turn connected, respectively, to the synchronous Ti(S) value calculating circuit 502 and the synchronous Ti(M) value calculating circuit 504. The synchronous Ti(S) value calculating circuit 502 has its output connected to a Ti(S) value control circuit 511 which is in turn connected to the subinjector 6b of the fuel injection device 6 in FIG. 3 by way of an injector driving circuit 512. The synchronous Ti(M) value calculating circuit 504 has its output connected to inputs of AND circuits 513a–513d which in turn have their outputs connected to respective ones of a Ti(M1) value control circuit 514a through a Ti(M4) value control circuit 514d. These circuits 514a–514d are connected to the respective main injectors 6a-1–6a-4 of the fuel injection device 6 in FIG. 3 by way of respective OR circuits 515a–515d and respective injector driving circuits 516a–516d. The up counter 505 has its output connected to a decoder 517 which in turn has its output terminals 517a–517d connected to the respective other inputs of the AND circuits 513a–513d. The starting switch 17 in FIG. 3 is connected to the input of a Schmitt circuit 518 to supply its output signal thereto. The Schmitt circuit 518 has its output connected to the inputs of the synchronous Ti(S) value calculating circuit 502 and the synchronous Ti(M) value calculating circuit 504 to supply an engine start-indicative signal ST thereto. The Schmitt circuit 518 is also connected to a second input terminal 507b of the programmable down counter 507 and the input of a Ti(INT) value calculating circuit 502 by way of a one shot circuit 519. The programmable down counter 507 has a third input terminal 507c connected to a data memory 521 storing a value of 4 corresponding to the number of the engine cylinders, and an output terminal 507d connected to the input of a decoder 522. The decoder 522 has its output connected to an input terminal 517f of the aforementioned decoder 517 and the other input terminal of the AND circuit 503 directly, and also to the other input terminal of the AND circuit 506 by way of an inverter 535, respectively. the engine water temperature sensor 10 and the battery voltage 18, both appearing in FIG. 3, have their respective output values stored in the aforementioned TW value register 510 and a TV value register 523, respectively, which in turn connected to the input of the Ti(INT) value calculating circuit 520. The circuit 520 has its output connected to an asynchronous Ti value control circuit 526 by way of an AND circuit 524 and an OR circuit 525. The circuit 526 has its output connected to the inputs of the aforementioned OR circuits 515a–515d. An asynchronous Ti value calculating circuit 527 has two input terminals connected, respectively, to a clock generator 528 and a θth value register 529 which stores an output value of the throttle valve opening sensor 11 in FIG. 3. The output of the asynchronous Ti value calculating circuit 527 is connected to the input of the aforementioned OR circuit 525 by way of an AND circuit 530. A comparator 531 has an input terminal 513a connected to an NCR value memory 532 and another input terminal 531b connected to an NE value register 533 which stores an NE value corresponding to the engine rpm calculated from the TDC signal. The output terminal 531c of the comparator 531 is connected to the input of the AND circuit 530 directly and to the AND circuit 524 by way of an inverter 534, respectively.

The operation of the circuit of FIG. 9 constructed above will now be described. When the starting switch 17 is turned on or closed, its turn on signal is shaped into a stepped square waveform by the Schmitt circuit 518, which is supplied as the signal ST to the one shot circuit 519 and the synchronous Ti value calculating circuits 502 and 504. Upon application of the signal ST having a stepped waveform to the one shot circuit 519, it generates a single rectangular phase signal and applies it as a starting command to the Ti(INT) value calculating circuit 520 as well as the programmable down counter 507. When supplied with the above starting command, the ti(INT) value calculating circuit 520 calculates a value of the valve opening period Ti(INT) for the main injectors in the manner described with reference to FIG. 8 on the basis of the output values of the engine water temperature TW value register 510 and the battery voltage TV value register 523, which are inputted to the circuit 520 immediately upon the closing of the starting switch 17. The valve opening period value Ti(INT) thus calculated is applied to one input terminal of the AND circuit 524. The above value opening period Ti(INT) is calculated only one time each time the starting command is inputted to the circuit 520. The value NCR, which corresponds to a predetermined engine rpm (e.g. 400 rpm) for determining whether or not the engine has just started, is stored in the NCR value memory 532, and inputted to one input terminal 531a of the comparator 531 as input $A_1$. The other input terminal 531b of the comparator 531 is supplied with a value NE corresponding to actual engine rpm Ne (The value NE is the reciprocal of actual engine rpm Ne, and therefore increases as the latter decreases), as input $B_1$ from the NE value register 533. When the input relationship of $B_1 < A_1$ does not stand, that is, when the engine is still in a starting condition where the actual engine rpm Ne is smaller than the predetermined value, e.g. 400 rpm, the comparator 531 generates a binary output of 0 at its output terminal 531c and applies it to the AND circuit 530. The same output of 0 is inverted into a high level of 1 by the inverter 534, which is applied to the other input terminal of the AND circuit 524. Therefore, when the actual engine rpm Ne is smaller than the predetermined value 400 rpm, the AND circuit 524 is opened to allow the valve opening period value Ti(INT) to be applied to the asynchronous Ti value control circuit 526 via the OR circuit 525. The asynchronous Ti value control circuit 526 generates an output signal for a period of time corresponding to the calculated valve opening period value Ti(INT) and applies it to the injector driving circuits 516a-1 516d through the respective OR circuits 515a-515d at the same time. The injector driving circuits 516a-516d are responsive to the above output signal of the circuit 526 to supply driving outputs to the respective main injectors 6a-1-6a-4 to open same at the same time.

On the other hand, the starting command outputted from the one shot circuit 519 is applied to the programmable down counter 507 as previously noted. The down counter 507 is also supplied at its third input terminal 507c with the initial data value of 4 from the data memory 521 as well as the output signal of the engine rpm sensor 11 through the one shot circuit 501 and the AND circuit 506 as the TDC signal. After supplied with the above starting command, the down counter 507 generates at its output terminal 507d an output having a value equal to the initial data vaue of 4 upon application of a first pulse of the TDC signal thereto, and an output having a value equal to 3 smaller by 1 than the previous value of 4, and successively applies these outputs to the decoder 522. That is, the programmable down counter 507 applies outputs successively decreasing in value to the decoder 522 upon application of each pulse of the TDC signal thereto. The decoder 522 is adapted to generate an output of 1 when the input data value is 0, and an output of 0 when it has other values than 0. Therefore, as long as the decoder 522 is supplied with four pulses of the TDC signal after the closing of the starting switch 17, that is, before the pistons of all the cylinders finish their first suction strokes, it continuously generates an output of 0 and applies it to the other input terminal of the AND circuit 503 as well as to the input terminal 517f of the decoder 517. Further, the above output of 0 of the decoder 522 is inverted into a high level of 1 by the inverter 535, which is applied to one input terminal of the AND circuit 506. Thus, during generation of the output of 0 from the decoder 522, the AND circuit 503 is kept closed, while the AND circuit 506 is kept opened. When the AND circuit 503 is closed, the TDC signal is not inputted to the up counter 505 as described hereinlater. Meanwhile, as long as the output of 0 of the decoder 522 is applied to the decoder 517, the latter decoder 517 does not apply its output of 1 to any of the AND circuits 513a-513d to keep them closed. Therefore, the output signal of the synchronous Ti(M) value calculating circuit 504 which calculates a value of the valve opening period Ti for the main injectors in synchronism with the TDC signal, is prevented from being applied to the Ti(M1) value control circuit 514a—the Ti(M4) value control circuit 514d. On the other hand, the other input terminal of the AND circuit 506 which is then opened is supplied with the TDC signal from the one shot circuit 501, to allow supply of the TDC signal to the programmable down counter 507 until the output of the decoder 522 turns 1, that is, a fourth pulse of the TDC signal is inputted to the counter 507 after the start of the engine. When the fourth pulse of the TDC signal is applied to the down counter 507, the decoder 522 is supplied with a data value of 0, which in turn generates an output of 1 and applies it to the AND circuit 503 and the decoder 517, and the output of 1 is inverted by the inverter 535 into a low level of 0 which is applied to the AND circuit 506. Thus, the AND circuit 503 becomes opened, while simultaneously the AND circuit 506 becomes closed. After this, the AND circuit 506 is kept closed until the programmable down counter 507 is supplied with another starting command generated by further closing of the starting switch 17. When the AND circuit 503 is opened as above, the one shot circuit 508 generates a reset pulse and applies it to the up counter 505 each time it is supplied with the output signal of the cylinder-discriminating sensor 12 in FIG. 3. The up counter 505 is resetted to its initial data value of 0 each time a reset pulse of the cylinder-discriminating sensor 12 is applied thereto. This counter 505 applies an initial data value of 0 to the decoder 517 when it has its other input terminal supplied with a first pulse of the TDC signal through the opened AND circuit 503, and thereafter applies data values gradually become larger, that is, 1, 2 and 3 to the decoder 517 as further TDC signal pulses are applied to the counter 505. The decoder 517 is adapted to generate its outputs through its selected four output terminals in predetermined order in dependence on the data values inputted thereto, to determine the order of fuel injection into the cylinders of the engine. More specifically, when the input data value is 0 for instance, the decoder 517 generates an output of 1 through its output terminal 517a for actuating the main injector for the first cylinder, and when the input data value is 1, 2 or 3, it generates an output of 1 through its output terminal 517c, 517d or 517b, respectively for actuating the main injectors for the third, fourth or second cylinders, respectively. The above outputs of 1 are applied to respective ones of the AND circuits 513a–513d. Let it now be assumed that the decoder 517 generates an output of 1 through its output terminal 517a and applies it to the AND circuit 513a, a value of the valve opening period Ti(M) calculated in synchronism with the TDC signal is applied to the Ti(M) value control circuit 514a through the opened AND circuit 513a. The control circuit 514a applies an output signal to the injector driving circuit 516a through the OR circuit 515a for a period of time corresponding to the calculated value of the valve opening period Ti(M), and the injector driving circuit 516a is responsive to this output signal of the control circuit 514a to apply a driving output to the first main injector 6a-1 to cause opening of same. When a second TDC signal pulse is applied to the up counter 505, the decoder 517 generates an output of 1 through its output terminal 517c and applies it to the AND circuit 513c, causing opening of the third main injector 6a-3 in a similar manner to that mentioned above. Thereafter, the main injectors are successively opened in the predetermined order in the above-described manner.

The control of the valve opening period of the subinjector 6b is carried out as follows: Each time a pulse of the TDC signal is inputted to the synchronous Ti(S) value calculating circuit 502 through the one shot circuit 501, starting at an instant immediately after the start of the engine, the circuit 502 calculates a value of the valve opening period Ti(S) of the subinjector on the basis of output values of the engine water temperature TW value register 510 and the absolute pressure PB value register 509, in synchronism with the inputting of TDC signal pulses, and the calculated value is applied to the Ti(S) value control circuit 511. The circuit 511 in turn applies an output signal to the subinjector driving circuit 512 for a period of time corresponding to the calculated valve opening period value Ti(S) to cause it to supply a driving output to the subinjector 6b to open same.

When the input relationship of $B_1 < A_1$ stands at the comparator 531, that is, when the actual engine rpm Ne is larger than the predetermined value NCR (e.g. 400 rpm), the comparator 531 applies an output of 1 through its output terminal 531c to the AND circuit 530, and simultaneously the same output of 1 is inverted into a low level of 0 by the inverter 534, which is applied to the AND circuit 524, thus rendering the AND circuit 530 opened and the AND circuit 524 closed. At engine acceleration, the AND circuit 530 is also supplied with a Ti value calculated by the asynchronous ti value calculating circuit 527 in asynchronism with the TDC signal. The above Ti value is then applied to the asynchronous Ti value control circuit 526 through the OR circuit 525 so that the circuit 526 and the injector driving circuits 516a–516d operate to open the respective injectors 6a-1–6a-4 for an increased valve opening period for supply of an increased amount of fuel to the cylinders of the engine.

Although the aforedescribed embodiment is applied to a four-cylinder engine, the invention may of course be applied to other multi-cylinder engines having other numbers of cylinders than four, as well.

What is claimed is:

1. An electronic fuel injection control system for electronically controlling the quantity of fuel being supplied to an internal combustion engine having a plurality of cylinders, an output shaft, and a starter, comprising: a sensor for detecting at least one predetermined angular position of said output shaft of said engine to generate a signal indicative of a detected angular position; a plurality of fuel injection valves corresponding in number to said cylinders, each provided for each of said cylinders; a control circuit adapted to cause opening of said fuel injection valves in synchronism with generation of said angular position signal, for supplying a controlled amount of fuel into said cylinders; and a starting switch adapted to actuate said starter of said engine when closed; said control circuit being operable to cause opening of all said fuel injection valves at the same time to supply fuel into respective ones of said cylinders immediately upon closing of said starting switch, keep closing of all said fuel injection valves until after all said cylinders have pistons thereof complete respective first suction strokes thereof after said closing of said starting switch, and upon completion of said first suction strokes of all said cylinders, cause successive opening of said fuel injection valves in predetermined sequence in synchronism with subsequent generation of said angular position signal occurring after the completion of said first suction strokes of all said cylinders to supply fuel to respective ones of said cylinders.

2. The electronic fuel injection control system as claimed in claim 1, wherein said control circuit is operable to start said successive opening of said fuel injection valves upon generation of a first pulse of said angular position signal occurring immediately after a number of pulses of said angular position signal corresponding to the number of said cylinder have been generated after said closing of said starting switch, and continue to carry out said successive opening of said fuel injection valves in said predetermined sequence in synchronism with generation of further pulses of said angular position signal occurring subsequently to said first pulse.

3. An electronic fuel injection control system for electronically controlling the quantity of fuel being supplied to an internal combustion engine having a plurality of cylinders each having a main combustion chamber and a sub combustion chamber, an output shaft, and a starter, comprising: a sensor for detecting at least one predetermined angular position of said output shaft of said engine to generate a signal indicative of a detected angular position; a plurality of main fuel injection valves corresponding in number to said cylinders, each provided for each of said cylinders for supplying a controlled amount of fuel to said main combustion chamber thereof; a sub fuel injection valve arranged for supplying fuel to said sub combustion chamber of each of said cylinders; a control circuit adapted to cause opening of said main fuel injection valves and said sub fuel injection valve in synchronism with generation of said angular position signal for supplying fuel, respectively, to said main combustion chambers and said sub combustion chambers; and a starting switch adapted to actuate said starter of said engine when closed; said control circuit being operable to cause opening of all said main fuel injection valves at the same time to supply fuel to respective ones of said main combustion chambers immediately upon closing of said starting switch, keep closing of all said main fuel injection valves until after all said cylinders have pistons thereof complete respective first suction strokes thereof after said closing of said starting switch, and upon completion of said first suction strokes of all said cylinders, cause successive opening of said main fuel injection valves in predetermined sequence in synchronism with subsequent generation of said angular position signal occurring after the completion of said first suction strokes of all said cylinders to supply fuel to respective ones of said main combustion chambers, said control circuit being also operable to cause opening of said sub fuel injection valve in synchronism with generation of said angular position signal occurring immediately after said closing of said starting switch and subsequent generation of the same signal to supply fuel to said sub combustion chambers.

* * * * *